United States Patent
Wright et al.

(10) Patent No.: US 9,892,331 B2
(45) Date of Patent: *Feb. 13, 2018

(54) IMAGING SYSTEM AND METHOD WITH EGO MOTION DETECTION

(71) Applicant: Gentex Corporation, Zeeland, MI (US)

(72) Inventors: David J. Wright, Grand Rapids, MI (US); David M. Falb, Grand Rapids, MI (US)

(73) Assignee: GENTEX CORPORATION, Zeeland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/664,921

(22) Filed: Jul. 31, 2017

(65) Prior Publication Data

US 2017/0357865 A1 Dec. 14, 2017

Related U.S. Application Data

(63) Continuation of application No. 14/462,888, filed on Aug. 19, 2014, now Pat. No. 9,721,172.

(60) Provisional application No. 61/867,379, filed on Aug. 19, 2013.

(51) Int. Cl.
*G06K 9/00* (2006.01)
*G06T 7/246* (2017.01)

(52) U.S. Cl.
CPC .......... *G06K 9/00825* (2013.01); *G06T 7/248* (2017.01); *G06T 2207/30252* (2013.01)

(58) Field of Classification Search
CPC .......... G06T 7/204; G06T 2207/30252; G06K 9/008258

USPC .......................................................... 348/148
See application file for complete search history.

(56) References Cited

U.S. PATENT DOCUMENTS

| | | | | |
|---|---|---|---|---|
| 2009/0252377 | A1* | 10/2009 | Akita | G06K 9/3241 382/106 |
| 2010/0073480 | A1* | 3/2010 | Hoek | G01P 1/08 348/148 |
| 2014/0168431 | A1* | 6/2014 | Goto | G06K 9/00369 348/143 |

OTHER PUBLICATIONS

G.-S. Young, R. Chellappa, "Inherent ambiguities in recovering 3-D motion of a planar surface from a noisy flow field", Acoustics Speech and Signal Processing 1990. ICASSP-90. 1990 International Conference on, pp. 2197-2200 vol. 4, 1990, ISSN 1520-6149.*

* cited by examiner

*Primary Examiner* — William C Vaughn, Jr.
*Assistant Examiner* — Jae N Noh
(74) *Attorney, Agent, or Firm* — Price Heneveld LLP; Bradley D. Johnson

(57) ABSTRACT

An imaging system and method for a vehicle is provided, and includes an imager configured to image a scene external and forward of the vehicle and to generate image data corresponding to the acquired images. A controller is configured to receive the image data and analyze an optical flow between successive image frames to compute a relative motion between the imager and the imaged scene, wherein the optical flow includes a pattern of apparent motion of objects of interest in the successive image frames.

20 Claims, 4 Drawing Sheets

IMAGING SYSTEM AND METHOD WITH EGO MOTION DETECTION

CROSS-REFERENCE TO RELATED APPLICATIONS

This application is a continuation of and claims priority to U.S. Pat. No. 9,721,172, filed on Aug. 19, 2014, entitled "IMAGING SYSTEM AND METHOD WITH EGO MOTION DETECTION," which claims the benefit under 35 U.S.C. §119(e) of U.S. Provisional Patent Application No. 61/867,379, filed on Aug. 19, 2013, entitled "SYSTEM AND METHOD FOR CONTROLLING EXTERIOR VEHICLE LIGHTS WITH EGO MOTION ESTIMATION," the entire disclosures of which are hereby incorporated herein by reference.

FIELD OF THE INVENTION

The present invention generally relates to imaging systems, and more specifically to imaging systems for use with a vehicle.

SUMMARY OF THE INVENTION

According to one aspect of the present invention, an imaging system for a vehicle is provided. The system includes an imager configured to image a scene external and forward of the vehicle and to generate image data corresponding to the acquired images. A controller is configured to receive the image data and analyze an optical flow between successive image frames to compute a relative motion between the imager and the imaged scene, wherein the optical flow includes a pattern of apparent motion of objects of interest in the successive image frames.

According to another aspect of the present invention, an imaging method for a vehicle is provided. The method includes the steps of: providing an imager for imaging a scene external and forward of the controlled vehicle and generating image data corresponding to the acquired images; providing a controller for receiving and analyzing the image data; and computing a relative motion between the imager and the imaged scene based on an optical flow between successive image frames, wherein the optical flow includes a pattern of apparent motion of objects of interest in the successive image frames.

According to yet another aspect of the present invention a non-transitory computer-readable medium is provided. The non-transitory readable medium has software instructions stored thereon that, when executed by a processor, include the steps of: using an imager to image a scene external and forward of the controlled vehicle and generating image data corresponding to the acquired images; receiving and analyzing the image data in a controller; and computing a relative motion between the imager and the imaged scene based on an optical flow between successive image frames, wherein the optical flow includes a pattern of apparent motion of objects of interest in the successive image frames.

These and other features, advantages, and objects of the present invention will be further understood and appreciated by those skilled in the art by reference to the following specification, claims, and appended drawings.

BRIEF DESCRIPTION OF THE DRAWINGS

The present invention will be become more fully understood from the detailed description and the accompanying drawings, wherein.

DETAILED DESCRIPTION OF THE PREFERRED EMBODIMENTS

Figure 1:
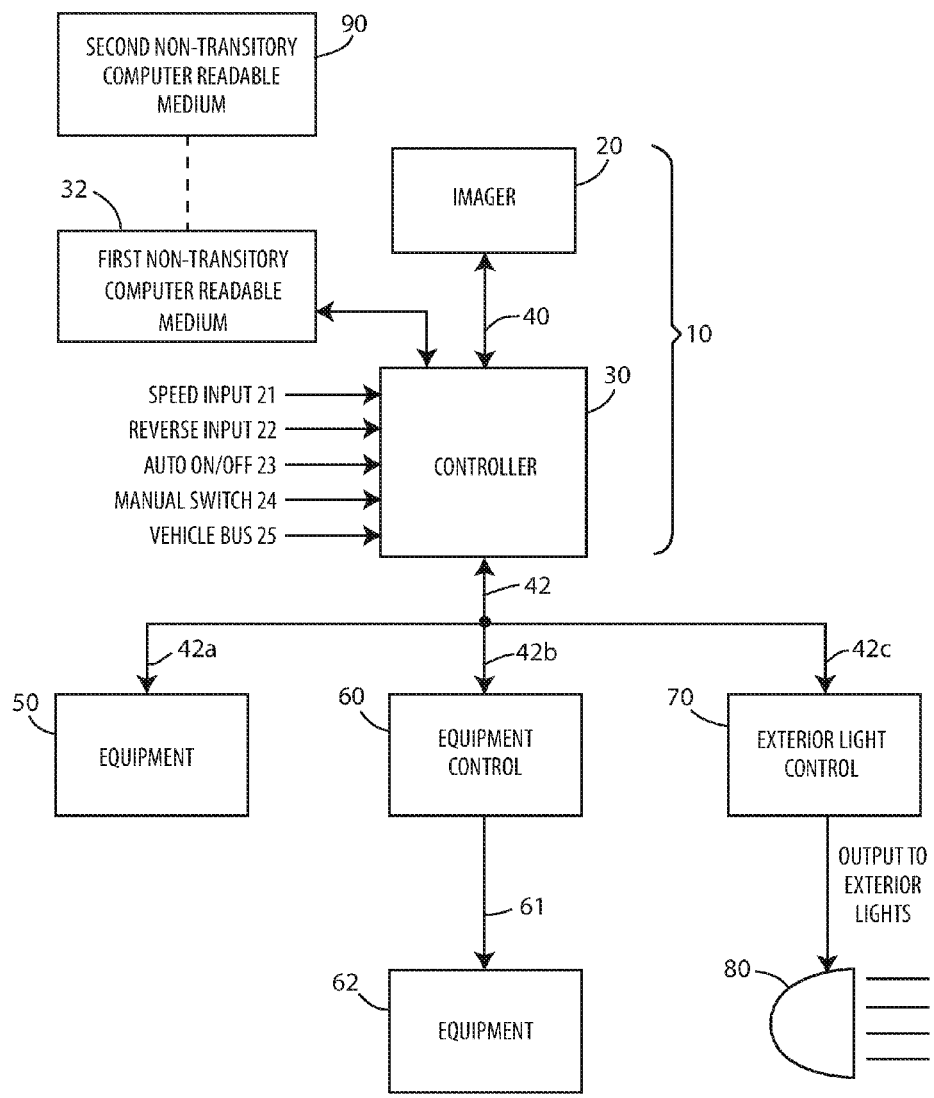
FIG. 1 is a block diagram of an imaging system of a controlled vehicle constructed according to an embodiment of the present invention.

Reference will now be made in detail to the present preferred embodiments of the invention, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

The embodiments described herein relate to an imaging system for a vehicle that may be used to detect and optionally categorize objects in a scene forward of the vehicle. To assist in the understanding of an application of these embodiments, examples are provided that pertain to the use of the imaging system in an exterior light control system for controlling exterior lights of a controlled vehicle in response to image data acquired from an image sensor, which captures images forward of the vehicle. Auto High Beam (AHB) and alternate methods of controlling the light beam illumination in front of a motor vehicle maximizes the use of high beams at night by identifying oncoming and preceding vehicles and automatically controlling the high beam lighting pattern. This prevents glare to other vehicles, yet maintains a high beam light distribution to illuminate areas not occupied by other vehicles. Prior systems are known for controlling exterior vehicle lights in response to images captured forward of the vehicle. In these prior systems, a controller would analyze the captured images and determine if any preceding or oncoming vehicles were present in a glare area in front of the vehicle employing the system. This "glare area" was the area in which the exterior lights would cause excessive glare to a driver if the exterior lights were in a high beam state (or some state other than a low beam state). If a vehicle was present in the glare area, the controller would respond by changing the state of the exterior lights so as to not cause glare for the other driver(s). Examples of such systems are described in U.S. Pat. Nos. 5,837,994, 5,990, 469, 6,008,486, 6,049,171, 6,130,421, 6,130,448, 6,166,698, 6,255,639, 6,379,013, 6,403,942, 6,587,573, 6,593,698, 6,611,610, 6,631,316, 6,653,614, 6,728,393, 6,774,988, 6,861,809, 6,906,467, 6,947,577, 7,321,112, 7,417,221, 7,565,006, 7,567,291, 7,653,215, 7,683,326, 7,881,839, 8,045,760, 8,120,652, and 8,543,254, the entire disclosures of which are incorporated herein by reference.

In some of the prior systems using AHB or alternative methods of controlling the light beam illumination in front of a motor vehicle, an imaging system would image a forward scene and the controller would analyze the captured images to detect whether the vehicle was in or entering a village (or town) that is sufficiently lighted. The controller would then typically either place the exterior lights in a low beam state or otherwise inhibit operation of high beam headlights. The high beams or alternate beam illumination are then reactivated when the village area is exited. Various methods are used including detecting streetlights or measuring the ambient brightness level when entering a village to determine whether to activate or re-activate the high beam headlights. Examples of such systems are described in U.S. Pat. Nos. 6,861,809, 7,565,006, and 8,045,760, and also in U.S. Pat. No. 8,983,135, the entire disclosures of which are incorporated herein by reference.

The aforementioned prior systems illustrate just a few ways in which the exterior lights of a controlled vehicle may be controlled in response to changing driving conditions. Oftentimes, proper operation of these and other similar systems requires accurate detection of one or more objects of interest in an imaged scene. Depending on the application, these objects of interest may be stationary objects such as streetlights, lane markers, signs, and/or moving objects such as the headlights or taillights of other travelling vehicles. Proper detection of objects of interest may be affected if the motion of an imaging system relative to the imaged scene, referred to herein as "ego motion," is unknown. During routine driving situations, there are many common conditions that may alter the motion of an imaging system relative to the imaged scene, such as bumpy roads, sudden turns, inclines/declines, etc. These conditions may cause stationary objects of interest to have apparent motion in successive image frames. Thus, if the ego motion of the imaging system is not accounted for, it may be difficult for an imaging system to perform various imaging operations since the system may be unable to determine which objects are actually moving and which objects only appear to be moving as a result of the imaging system's ego motion, and to a similar extent, the controlled vehicle's ego motion. Thus, in light of the above, an imaging system of a controlled vehicle is advantageously provided herein and is configured to analyze the optical flow between successive image frames to estimate the ego motion of its imaging system in order to correct for the apparent motion of imaged objects. As used herein, "optical flow" is defined as the pattern of apparent motion of objects of interest in successive image frames caused by the relative motion between the imaging system and the scene being imaged.

A first embodiment of an imaging system 10 is shown in FIG. 1. Imaging system 10 may be provided for controlling exterior lights 80 and, optionally, other equipment (50, 62) of a controlled vehicle. System 10 includes an imager 20 and a controller 30. Imager 20 includes an image sensor (201, FIG. 2) that is configured to image a scene external and forward of the controlled vehicle and to generate image data corresponding to the acquired images. Controller 30 receives and analyzes the image data and generates an exterior light control signal that may be used to control exterior lights 80 and may generate control signals to control any additional equipment (50, 62). These control signals can be generated in response to analysis of the image data.

If imaging system 10 is used in a vehicle equipment control system, controller 30 may be configured to directly connect to the equipment (50) being controlled such that the generated control signals directly control the equipment. Alternatively, controller 30 may be configured to connect to an equipment control (60 and 70), which, in turn, is connected to the equipment being controlled (62 and 80) such that the control signals generated by controller 30 only indirectly control the equipment. For example, in the case of the equipment being exterior lights 80, controller 30 may analyze the image data from imager 20 so as to generate control signals that are more of a recommendation for an exterior light control 70 to use when controlling exterior lights 80. Thus, it can be said that the control signals are used to control the equipment. The control signals may further include not just a recommendation, but also a code representing a reason for the recommendation so that equipment controls (60 and 70) may determine whether or not to override a recommendation.

As shown in FIG. 1, various inputs (such as inputs 21-24) may be provided to controller 30 that may be taken into account in analyzing the image data or forming a recommendation or direct control signal. In some cases, such inputs may instead be provided to equipment control (60 and 70). For example, input from manual switches may be provided to equipment control (60 and 70), which may allow equipment control (60 and 70) to override a recommendation from controller 30. It will be appreciated that various levels of interaction and cooperation between controller 30 and equipment controls (60 and 70) may exist. One reason for separating control functions is to allow imager 20 to be located in the best location in the vehicle for obtaining images, which may be a distance from the equipment to be controlled and to allow communication over the vehicle bus 25.

According to one embodiment, the equipment that system 10 can control may include one or more exterior lights 80 and the control signal generated by controller 30 may be an exterior light control signal. In this embodiment, exterior lights 80 may be controlled directly by controller 30 or by an exterior light control 70, which receives a control signal from controller 30. As used herein, the "exterior lights" broadly includes any exterior lighting on the vehicle. Such exterior lights may include headlights (both low and high beam if separate from one another), taillights, foul weather lights such as fog lights, brake lights, center-mounted stop lights (CHMSLs), turn signals, back-up lights, etc. The exterior lights may be operated in several different modes including conventional low beam and high beam states. They may also be operated as daytime running lights, and additionally as super-bright high beams in those countries where they are permitted.

The exterior light brightness may also be continuously varied between the low, high, and super-high states. Separate lights may be provided for obtaining each of these exterior lighting states or the actual brightness of the exterior lights may be varied to provide these different exterior lighting states. In either case, the "perceived brightness" or illumination pattern of the exterior lights is varied. As used herein, the term "perceived brightness" means the brightness of the exterior lights as perceived by an observer outside the vehicle. Most typically, such observers will be drivers or passengers in a preceding vehicle or in a vehicle traveling along the same street in the opposite direction. Ideally, the exterior lights are controlled such that if an observer is located in a vehicle within a "glare area" relative to the vehicle (i.e., the area in which the observer would perceive the brightness of the exterior lights as causing excessive glare), the beam illumination pattern is varied such that the observer is no longer in the glare area. The perceived brightness and/or glare area of the exterior lights may be varied by changing the illumination output of one or more exterior lights, by steering one or more lights to change the aim of one or more of the exterior lights, selectively blocking or otherwise activating or deactivating some or all of the exterior lights, altering the illumination pattern forward of the vehicle, or a combination of the above.

Imager 20 may be any conventional imager. Examples of suitable imagers are disclosed in published U.S. Pat. Nos. 8,289,430 and 8,924,078, and in U.S. Provisional Application Nos. 61/500,418 entitled "MEDIAN FILTER" filed on Jun. 23, 2011, by Jon H. Bechtel et al.; Ser. No. 61/544,315 entitled "MEDIAN FILTER" and filed on Oct. 7, 2011, by Jon H. Bechtel et al.; Ser. No. 61/556,864 entitled "HIGH DYNAMIC RANGE CAMERA LOW LIGHT LEVEL FILTERING" filed on Nov. 8, 2011, by Jon H. Bechtel et al., the entire disclosures of which are incorporated herein by reference.

The imaging system 10 may include an image sensor (201, FIG. 2) or camera to capture images that may then be displayed and/or analyzed in order to detect and optionally categorize objects or to optionally control vehicle equipment in addition to exterior lights. For example, such imagers have been used for lane departure warning systems, forward collision warning systems, adaptive cruise control systems, pedestrian detection systems, night vision systems, terrain detection systems, parking assist systems, traffic sign recognition systems, and reverse camera display systems. Examples of systems using imagers for such purposes are disclosed in U.S. Pat. Nos. 5,837,994, 5,990,469, 6,008,486, 6,049,171, 6,130,421, 6,130,448, 6,166,698, 6,379,013, 6,403,942, 6,587,573, 6,611,610, 6,631,316, 6,774,988, 6,861,809, 7,321,112, 7,417,221, 7,565,006, 7,567,291, 7,653,215, 7,683,326, 7,881,839, 8,045,760, and 8,120,652, and in U.S. Provisional Application Nos. 61/512,213 entitled "RAISED LANE MARKER DETECTION SYSEM AND METHOD THEREOF" and filed on Jul. 27, 2011, by Brock R. Rycenga et al., and 61/512,158 entitled "COLLISION WARNING SYSTEM AND METHOD THEREOF" and filed on Jul. 27, 2011, by Brock R. Rycenga et al., which together correspond to U.S. Pat. No. 9,098,751, the entire disclosures of which are incorporated herein by reference.

In the example shown in FIG. 1, imager 20 may be controlled by controller 30. Communication of imaging system parameters as well as image data occurs over communication bus 40, which may be a bi-directional serial bus, parallel bus, a combination of both, or other suitable means. Controller 30 serves to perform equipment control functions by analyzing images from imager 20, determining an equipment (or exterior light) state based upon information detected within those images, and communicating the determined equipment (or exterior light) state to the equipment 50, equipment control 60, or exterior light control 70 through bus 42, which may be the vehicle bus 25, a CAN bus, a LIN bus or any other suitable communication link. Controller 30 may control the imager 20 to be activated in several different modes with different exposure times and different readout windows. Controller 30 may be used to both perform the equipment or exterior light control function and control the parameters of imager 20.

Controller 30 can also take advantage of the availability of signals (such as vehicle speed, steering wheel angle, pitch, roll, and yaw) communicated via discreet connections or over the vehicle bus 25 in making decisions regarding the operation of the exterior lights 80. In particular, speed input 21 provides vehicle speed information to the controller 30 from which speed can be a factor in determining the control state for the exterior lights 80 or other equipment. The reverse signal 22 informs controller 30 that the vehicle is in reverse, responsive to which the controller 30 may clear an electrochromic mirror element regardless of signals output from light sensors. Auto ON/OFF switch input 23 is connected to a switch having two states to dictate to controller 30 whether the vehicle exterior lights 80 should be automatically or manually controlled. The auto ON/OFF switch (not shown) connected to the ON/OFF switch input 23 may be incorporated with the headlight switches that are traditionally mounted on the vehicle dashboard or incorporated into steering wheel column levels. Manual dimmer switch input 24 is connected to a manually actuated switch (not shown) to provide a manual override signal for an exterior light control state. Some or all of the inputs 21, 22, 23, 24 and outputs 42a, 42b, and 42c, as well as any other possible inputs or outputs, such as a steering wheel input, can optionally be provided through vehicle bus 25 shown in FIG. 1. Alternatively, these inputs 21-24 may be provided to equipment control 60 or exterior light control 70.

Controller 30 can control, at least in part, other equipment 50 within the vehicle, which is connected to controller 30 via vehicle bus 42. Specifically, the following are some examples of one or more equipment 50 that may be controlled by controller 30: exterior lights 80, a rain sensor, a compass, information displays, windshield wipers, a heater, a defroster, a defogger, an air conditioning system, a telephone system, a navigation system, a security system, a tire pressure monitoring system, a garage door opening transmitter, a remote keyless entry system, a telematics system, a voice recognition system such as a digital signal processor based voice actuation system, a vehicle speed control, interior lights, rearview mirrors, an audio system, an engine control system, and various other switches and other display devices that may be located throughout the vehicle.

In addition, controller 30 may be, at least in part, located within a rearview assembly of a vehicle or located elsewhere within the vehicle. The controller 30 may also use a second controller (or controllers), equipment control 60, which may be located in a rearview assembly or elsewhere in the vehicle in order to control certain kinds of equipment 62. Equipment control 60 can be connected to receive via vehicle bus 42 control signals generated by controller 30. Equipment control 60 subsequently communicates and controls equipment 62 via bus 61. For example, equipment control 60 may be a windshield wiper control unit which controls windshield wiper equipment, turning this equipment ON or OFF. Equipment control may also be an electrochromic mirror control unit where controller 30 is programmed to communicate with the electrochromic control unit in order for the electrochromic control unit to change the reflectivity of the electrochromic mirror(s) in response to information obtained from an ambient light sensor, a glare sensor, as well as any other components coupled to the processor. Specifically, equipment control unit 60 in communication with controller 30 may control the following equipment: exterior lights, a rain sensor, a compass, information displays, windshield wipers, a heater, a defroster, a defogger, air conditioning, a telephone system, a navigation system, a security system, a tire pressure monitoring system, a garage door opening transmitter, a remote keyless entry, a telemetry system, a voice recognition system such as a digital signal processor-based voice actuation systems, a vehicle speed, interior lights, rearview mirrors, an audio system, a climate control, an engine control, and various other switches and other display devices that may be located throughout the vehicle.

Figure 2:
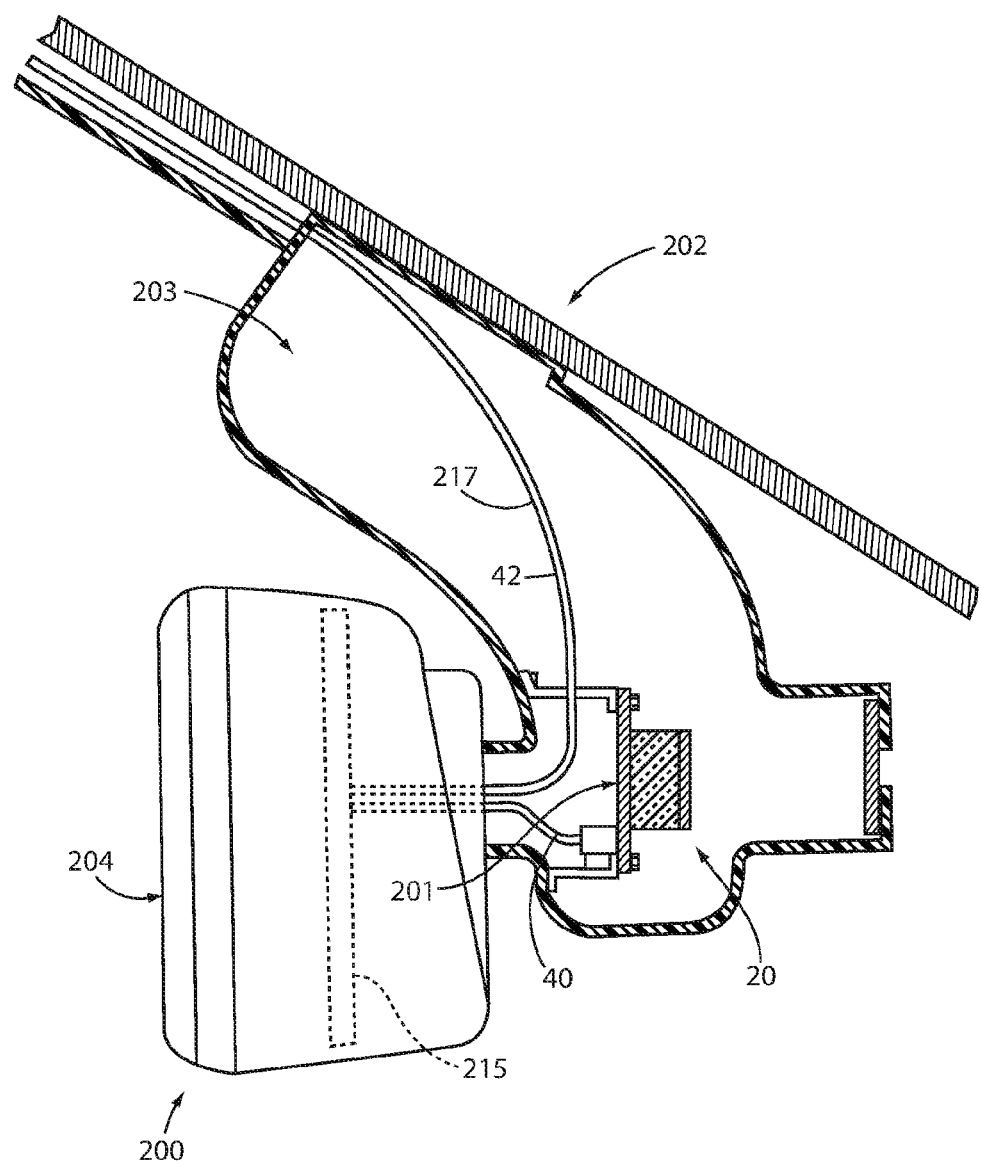
FIG. 2 is a partial cross section of a rearview mirror assembly incorporating an imaging system according to the embodiment shown in FIG. 1.

Portions of system 10 can be advantageously integrated into a rearview assembly 200 as illustrated in FIG. 2, wherein imager 20 is integrated into a mount 203 of rearview assembly 200. This location provides an unobstructed forward view through a region of the windshield 202 of the vehicle that is typically cleaned by the vehicle's windshield wipers (not shown). Additionally, mounting the image sensor 201 of imager 20 in the rearview assembly 200 permits sharing of circuitry such as the power supply, microcontroller and light sensors.

Referring to FIG. 2, image sensor 201 is mounted within rearview mount 203, which is mounted to vehicle windshield 202. The rearview mount 203 provides an opaque enclosure for the image sensor with the exception of an aperture through which light is received from a forward external scene.

Controller 30 of FIG. 1 may be provided on a main circuit board 215 and mounted in rearview housing 204 as shown in FIG. 2. As discussed above, controller 30 may be connected to imager 20 by a bus 40 or other means. The main circuit board 215 may be mounted within rearview housing 204 by conventional means. Power and a communication link 42 with the vehicle electrical system, including the exterior lights 80 (FIG. 1), are provided via a vehicle wiring harness 217 (FIG. 2).

Rearview assembly 200 may include a mirror element or a display that displays a rearward view. The mirror element may be a prismatic element or an electro-optic element, such as an electrochromic element.

Additional details of the manner by which system 10 may be integrated into a rearview mirror assembly 200 are described in U.S. Pat. No. 6,611,610, the entire disclosure of which is incorporated herein by reference. Alternative rearview mirror assembly constructions used to implement imaging systems are disclosed in U.S. Pat. No. 6,587,573, the entire disclosure of which is incorporated herein by reference.

A method for computing and correcting for ego motion will now be described and may be used with the previously described imaging system 10. For purposes of illustration, the method is described below as being implemented by controller 30 using image data received from imager 20. The method may be a subroutine executed by any processor, and thus the method may be embodied in a non-transitory computer readable medium having stored thereon software instructions that, when executed by a processor, cause the processor to control the equipment of the controlled vehicle, by executing the steps of the method described below. In other words, aspects of the inventive method may be achieved by software stored on a non-transitory computer readable medium or software modifications or updates to existing software residing in a non-transitory computer readable medium. Such software or software updates may be downloaded into a first non-transitory computer readable media 32 of controller 30 (or locally associated with controller 30 or some other processor) typically prior to being installed in a vehicle, from a second non-transitory computer readable media 90 located remote from first non-transitory computer readable media 32 (See FIG. 1). Second non-transitory computer readable media 90 may be in communication with first non-transitory computer readable media 32 by any suitable means, which may at least partially include the Internet or a local or wide area wired or wireless network.

According to one implementation, the method for computing the ego motion of the imaging system 10 includes computing a relative motion between the imager 20 and the imaged scene in both a horizontal X direction and a vertical Y direction, which will now be described in greater detail with reference to FIG. 3.

Figure 3:
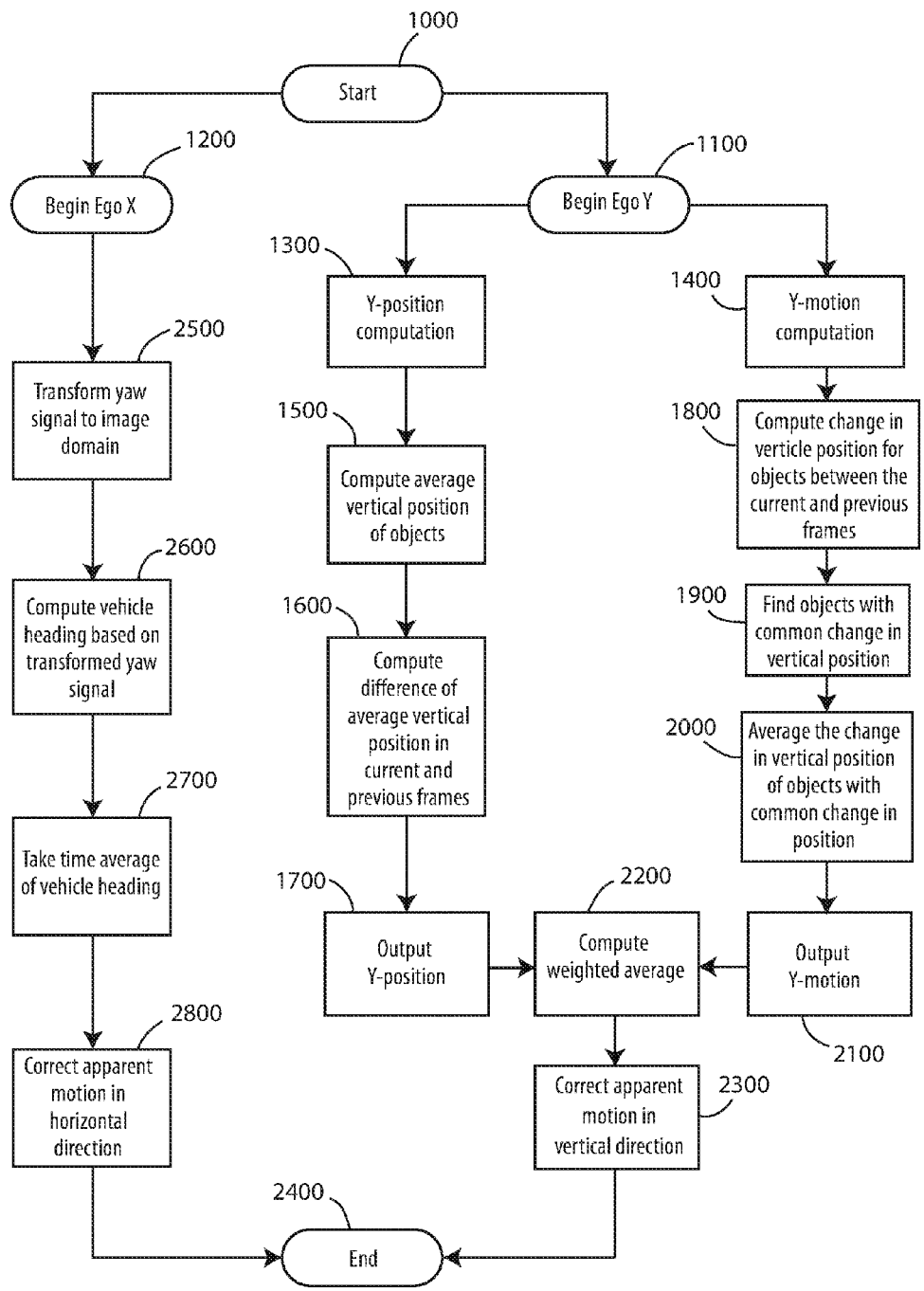
FIG. 3 is a flow chart illustrating a routine for computing an ego motion of an imaging system used in the imaging system according to the embodiment shown in FIGS. 1 and 2.

FIG. 3 shows a flow chart illustrating various steps to be executed by the controller 30.

Beginning with step 1000, the controller 30 initiates the ego motion computation and correction method. The method may be initiated when the controller detects one or more objects of interest in the image data. As previously described, objects of interest may include stationary objects such as streetlights, lane markers, signs, and/or moving objects such as the headlights or taillights of other travelling vehicles. The controller 30 then proceeds to steps 1100 and 1200, which may be performed in parallel. In step 1100, the controller 30 begins an Ego Y process for computing and correcting for the ego motion's Y component, whereas in step 1200, the controller 30 begins an Ego X process for computing and correcting for the ego motion's X component.

Discussion first turns to step 1100, from which the controller 30 proceeds to steps 1300 and 1400, which may be performed in parallel. In step 1300, the controller 30 computes a vertical position value, which is based on a change in vertical position for a number of detected objects of interest appearing in successive image frames and will be described in further detail in reference to FIG. 4.

Figure 4:
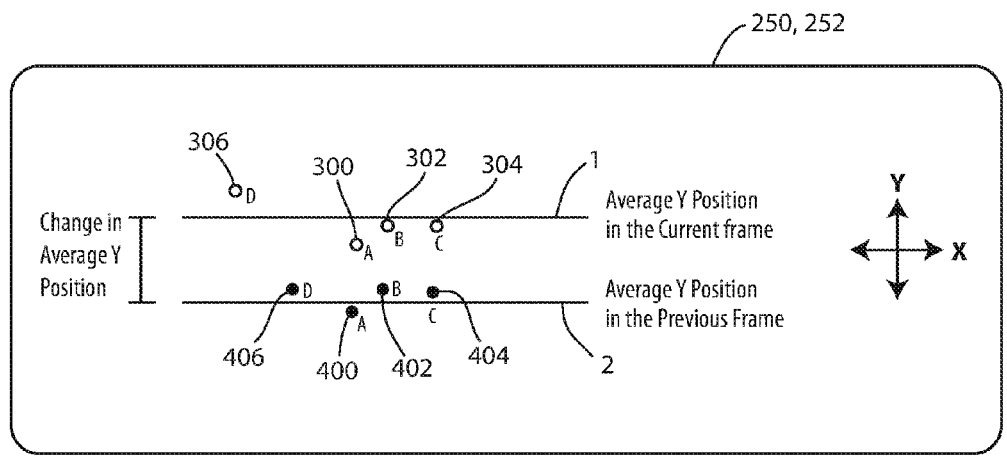
FIG. 4 is a pictorial representation of the optical flow between successive image frames, wherein the image frames are superimposed to help illustrate the computation of a vertical position value.

FIG. 4 exemplarily shows the optical flow of objects A, B, C, and D in a sequence of two consecutive image frames defined as a current frame 250 and a previous frame 252. For purposes of illustration, the current frame and the previous frame are superimposed in FIG. 4 to better illustrate the optical flow therebetween. With respect to the current frame 250, objects A, B, C, and D are shown imaged at corresponding positions 300, 302, 304, and 306, while in the previous frame 252, objects A, B, C, and D were imaged at corresponding positions 400, 402, 404, and 406. To determine the vertical position value, the average vertical position of objects A-D in the current and previous frames 250, 252 are computed in step 1500 and is shown by corresponding lines 1 and 2 in FIG. 4. Next, in step 1600, the controller 30 computes the difference between the average vertical position of the current frame 250 (line 1) and the average vertical position of the previous frame 252 (line 2). The difference is outputted as the vertical position value in step 1700, signaling the end of step 1300.

Figure 5:
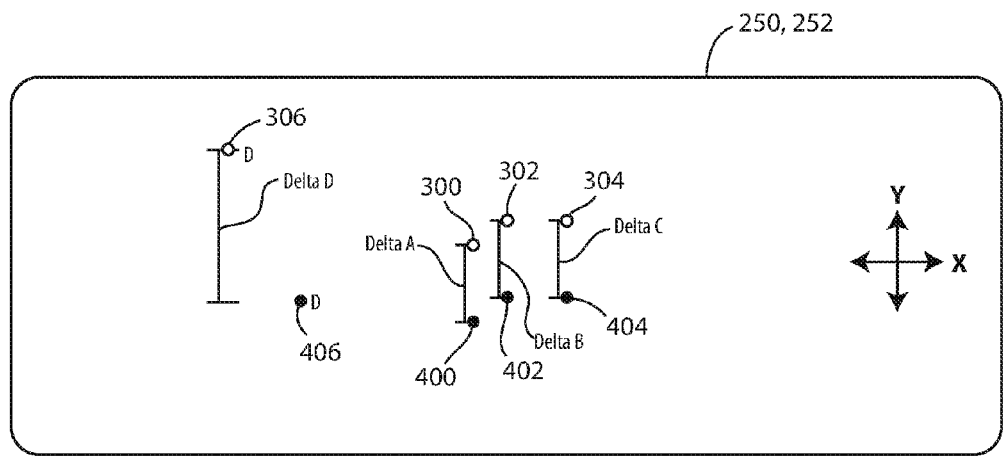
FIG. 5 is the same pictorial representation as shown in FIG. 4, but instead illustrates the computation of a vertical motion value.

Referring back to step 1400, the controller 30 computes a vertical motion value. The vertical motion value is based on a change in vertical position for only those detected objects of interest appearing in successive image frames and having a common apparent motion in the vertical direction. The computation of the vertical motion value will be described in further detail with reference to FIG. 5, which also illustrates the optical flow of objects A-D previously shown in FIG. 4. To determine the vertical motion value, the controller 30 computes the change in vertical position of each object A-D between the current and previous frames 250, 252 in step 1800, which is shown in FIG. 5 as DeltaA for object A, DeltaB for object B, DeltaC for object C, and DeltaD for object D. Next, in step 1900, the controller 30 identifies any objects having a common change in vertical position, such as objects A, B, and C, as this shows that their motion between image frames is more likely to be apparent than actual. Once the objects having a common change in vertical position are identified, the controller 30 sums up their respective changes in vertical position (DeltaA, DeltaB, and DeltaC) and takes the average value in step 2000, which is outputted as the vertical motion value in step 2100, signaling the end of step 1400. According to one implementation, objects not having a common change in vertical position (e.g. object D) are not considered when computing the vertical motion value.

Having completed steps 1300 and 1400, the controller 30 computes a weighted average between the vertical position value and the vertical motion value in step 2200. The weighted average indicates the relative motion between the imager 20 and the imaged scene in the vertical direction. Accordingly, the weighted average may be used to correct for apparent motion caused by the ego motion of imager 20 in the vertical direction. Once the correction has been made, the controller 30 ends the Ego Y process at step 2400 and may return back to step 1100 to repeat the Ego Y process so long as objects of interest are present in subsequent image frames.

Discussion now turns to the Ego X process, which begins at step 1200. In step 2500, the controller 30 obtains and transforms a yaw signal of the vehicle to the image domain. Based on the transformed yaw signal, the controller 30 computes a vehicle heading in step 2600. The controller 30 then takes a time average of the vehicle heading in step 2700, which indicates the relative motion between the imager 20 and the imaged scene in the horizontal direction and may be used accordingly in step 2800 to correct for apparent motion in the horizontal direction caused by the ego motion of the camera 20. Once the correction has been made, the controller 30 ends the Ego X process at step 2400. The controller 30 may then return back to step 1200 to repeat the Ego X process so long as objects of interest are present in subsequent image frames.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. An imaging system for a vehicle, comprising:
   an imager configured to acquire one or more images of a scene external and forward of the vehicle and to generate image data corresponding to the one or more acquired images; and
   a controller configured to:
   analyze the image data to detect objects of interest in successive image frames, wherein each object of interest comprises one of a moving object and a stationary object;
   compute a first value based on a change in position for each object of interest appearing in the successive image frames;
   compute a second value based on a change in position for only the objects of interest appearing in the successive image frames as having a common apparent motion, wherein moving objects are excluded from the computation of the second value; and
   determine a relative motion between the imager and the scene based on the first and second values.

2. The imaging system of claim 1, wherein the controller computes the first value by averaging the positions of objects of interest in each image frame and taking the difference between the averages determined for each image frame.

3. The imaging system of claim 1, wherein the controller computes the second value by summing the changes in position of only the objects of interest appearing in the successive images as having the common apparent motion and averaging the sums.

4. The imaging system of claim 1, wherein the controller determines the relative motion by taking a weighted average of the first and second values.

5. The imaging system of claim 1, wherein the change in position comprises a change in vertical position and the common apparent motion is in a vertical direction.

6. The imaging system of claim 1, wherein the controller is further configured to compute a heading of the vehicle by transforming a yaw signal to an image domain, and wherein the relative motion is further based on a time average of the heading.

7. The imaging system of claim 1, wherein based on the determined relative motion, the controller corrects apparent motion of objects of interest caused by ego motion of the imager.

8. The imaging system of claim 1, integrated in a rearview mirror assembly of the vehicle.

9. An imaging system for a vehicle, comprising:
   an imager configured to acquire one or more images of a scene external and forward of the vehicle and to generate image data corresponding to the one or more acquired images; and
   a controller configured to:
   analyze the image data to detect objects of interest in successive image frames, wherein each object of interest comprises one of a moving object and a stationary object;
   compute a first value corresponding to a total average change in position for all objects of interest appearing in the successive image frames;
   compute a second value corresponding to a total average sum of changes in position for only the objects of interest appearing in the successive images as having a common apparent motion, wherein moving objects are excluded from the computation of the second value; and
   determine a relative motion between the imager and the scene based on the first and second values.

10. The imaging system of claim 9, wherein the controller determines the relative motion by taking a weighted average of the first and second values.

11. The imaging system of claim 9, wherein the change in position comprises a change in vertical position and the common apparent motion is in a vertical direction.

12. The imaging system of claim 9, wherein the controller is further configured to compute a heading of the vehicle by transforming a yaw signal to an image domain, and wherein the relative motion is further based on a time average of the heading.

13. The imaging system of claim 9, wherein based on the determined relative motion, the controller corrects apparent motion of objects of interest caused by ego motion of the imager.

14. The imaging system of claim 9, integrated in a rearview mirror assembly of the vehicle.

15. A non-transitory computer-readable medium having stored thereon software instructions that, when executed by a processor, comprise the steps of:
   acquiring one or more images of a scene external and forward of a vehicle and generating image data corresponding to the one or more acquired images;

analyzing the image data to detect objects of interest in successive image frames, wherein each object of interest comprises one of a moving object and a stationary object;

computing a first value based on a change in position for each object of interest appearing in the successive image frames;

computing a second value based on a change in position for only the objects of interest appearing in the successive image frames as having a common apparent motion, wherein moving objects are excluded from the computation of the second value; and determining a relative motion between the imager and the scene based on the first and second values.

16. The non-transitory computer-readable medium of claim 15, wherein the step of computing the first value comprises averaging the positions of objects of interest in each image frame and taking the difference between the averages determined for each image frame.

17. The non-transitory computer-readable medium of claim 15, wherein the step of computing the second value comprises summing the changes in position of only the objects of interest appearing in the successive images as having the common apparent motion and averaging the sums.

18. The non-transitory computer-readable medium of claim 15, further comprising the step of computing a heading of the vehicle by transforming a yaw signal to an image domain and taking a time average of the heading, wherein the relative motion is further based on the time averaged heading.

19. The non-transitory computer-readable medium of claim 15, further comprising the step of correcting apparent motion of objects of interest caused by ego motion of the imager.

20. The non-transitory computer-readable medium of claim 15, wherein the change in position comprises a change in vertical position and the common apparent motion is in a vertical direction.

* * * * *